Fig. 1

INVENTOR.
EARL BARTHOLOMEW
BY Donald T. Johnson

Fig. 2

March 2, 1965  E. BARTHOLOMEW  3,171,395
INTERNAL COMBUSTION ENGINE AND METHOD OF OPERATING SAME
Filed Feb. 8, 1962  4 Sheets-Sheet 3

INVENTOR.
EARL BARTHOLOMEW
BY Donald T. Johnson

March 2, 1965  E. BARTHOLOMEW  3,171,395
INTERNAL COMBUSTION ENGINE AND METHOD OF OPERATING SAME
Filed Feb. 8, 1962  4 Sheets-Sheet 4

INVENTOR.
EARL BARTHOLOMEW
BY

United States Patent Office 3,171,395
Patented Mar. 2, 1965

3,171,395
INTERNAL COMBUSTION ENGINE AND METHOD OF OPERATING SAME
Earl Bartholomew, Birmingham, Mich., assignor to Ethyl Corporation, New York, N.Y., a corporation of Virginia
Filed Feb. 8, 1962, Ser. No. 171,856
24 Claims. (Cl. 123—127)

This invention relates to a method of operating a multi-cylinder, spark-ignited internal combustion engine. More particularly the invention provides a method for reducing maldistribution of fuel constituents among the individual engine cylinders, minimizing lag of fuel in the intake manifold during acceleration, lessening the volume of unburned products emitted from said engine, and improving the effectiveness of antiknock compounds contained in the fuel. The invention also relates to novel apparatus for coordinated operation of the components of a dual system for fuel induction to achieve the objects of the invention without loss of engine power and without the shortcomings of dual induction systems proposed by the prior art.

Large power output at high speed is obtained from the engines of current automobiles by provision of unobstructed breathing. Carburetors and intake manifolds must be large in cross section to provide free flow of mixture at high engine speed. On the other hand such cross-sectional areas are far larger than needed for free mixture flow at low speeds and result in low velocities and their associated disadvantages described hereinafter.

Ideally, gasoline is vaporized in the air stream flowing through the carburetor and intake manifold and is delivered in equal amounts to the individual engine cylinders along with equal quantities of air. However, in actual operation, due to various practical limitations, only a portion of the fuel, comprising largely lower-boiling constituents, is truly vaporized in the carburetor and intake manifold. An additional portion of the gasoline, because of the velocity of the air, moves through the intake manifold by entrainment in the air stream as small droplets. The amount of gasoline that can be so transported is small when velocity in the intake manifold is low but increases when the velocity becomes higher. The remaining fuel, containing a large concentration of high-boiling hydrocarbons and high-boiling antiknock compounds which have been added to the fuel, remains in liquid form, flows along the walls of the intake manifold and distributes unequally to the cylinders.

This pattern of transportation of fuel from the carburetor to the engine cylinders produces several undesirable results which are most evidenced at low engine speeds where air velocity through the carburetor and intake manifold is at a minimum. Inasmuch as the unvaporized liquid fuel and antiknock compounds are unequally distributed to the cylinders, the total amount of fuel and antiknock compound entering the individual cylinders varies considerably. Since the cylinders receive substantially equal amounts of air, the unequal distribution of liquid causes differences in the ratio of fuel-to-air in the cylinders as well as variations in the amounts of antiknock compounds. Thus the quality as well as the quantity of fuel varies from cylinder to cylinder. Since one or more cylinders receive fuel which has lower antiknock quality than that of the whole fuel, knocking is more pronounced than it would be if all constituents of the fuel were equally distributed. If the less volatile constituents of the fuel have higher antiknock quality than the more volatile components, as is often the case when aromatic hydrocarbons and metallic antiknock compounds are present, the antiknock quality of the fuel is lowest in the cylinders which receive the smallest amount of unvaporized liquid fuel. Moreover, the mixture ratio in these cylinders usually is closer to that which produces maximum knock. In consequence, the cylinders receiving the leanest mixture have an even greater tendency toward knocking.

In order to insure firing and knock-free operation of the lean cylinders, it is necessary to supply a richer mixture at the carburetor. This enrichment of the mixture is detrimental to fuel economy. Moreover, because the excess fuel in the richer cylinders is not completely burned, exhaust products high in carbon monoxide and in unburned and partially burned hydrocarbons are discharged to the atmosphere. These noxious gases contribute to atmospheric pollution known as smog and, hence, it is desirable that such emissions be kept at as low a level as possible.

Richer mixtures than that for maximum economy are required for highest power. As the mixture is made richer than that for maximum power, the rate of power decrease is small, but as the mixture is made leaner the rate of power loss is large. Thus, maximum power of currently produced automobile engines is obtained when the leanest cylinders receive approximately the best power mixture. Because of maldistribution of fuel, the other cylinders receive richer mixtures. Fuel economy is less than would be obtainable with equal distribution of fuel, and the emission of unburned hydrocarbons and carbon monoxide is greater.

Low velocity in the intake manifold is even more detrimental during acceleration at low engine speed. When the throttle is opened quickly, the vaporized and unvaporized fuel and antiknock compound must be accelerated before they can be carried along in the air stream. The vaporized molecules and unvaporized droplets have high inertia relative to that of air molecules, and hence, considerable air velocity is required to prevent lag of a large part of the fuel and antiknock compound in the manifold until higher engine speed is reached. Automobile carburetors compensate for this lag by supplying additional fuel—often as much as several milliliters—at the beginning of full-throttle acceleration. This supplementary fuel causes a further loss of fuel economy and an additional increase in emission of atmospheric pollutants.

The maldistribution of antiknock compound under conditions of steady operation and the lag during acceleration at low engine speed, both decrease the effectiveness of antiknock compounds. Compensation for this reduced effectiveness is variously provided in present automobiles by still richer mixtures, retarded ignition timing, lower compression ratios or fuels of higher octane number.

From the standpoints of atmospheric pollution and reduced fuel economy, the largest effects of low velocity in the intake manifold occur during engine starting and warmup. Because of low engine temperature during these events, fuel vaporization is at a very low level. In addition, because of low manifold velocity, only a small amount of fuel can be carried along by entrainment in the air stream. As a consequence, heavy choking of the carburetor is employed to supply a very large volume of fuel whereby the vaporization of the most volatile constituents is sufficient to form a combustible mixture in the cylinders. During starting, the weight ratio of fuel-to-air varies from about 0.6 to 3.5 with a typical value 1.5, whereas the stoichiometric ratio is in the region of 0.07. For several miles of operation during warmup, the choke is partially closed. Although the mixture ratio is not as rich as during starting, it is nevertheless far richer than after warmup. The fuel delivered by the carburetor which is in excess of the amount that can be burned with the air in the cylinders appears as unburned or partially burned constituents in the exhaust products. Operation with the choke at various degrees of closure accounts in a large measure for the poor gasoline economy in city driving as well as for a high percentage of the atmospheric pollution attributable to automobiles.

Because of the economic importance of reduced fuel economy and depreciated effectiveness of antiknock compounds, and the physiological effects of smog, all attributable in substantial measure to the rich fuel-air mixtures necessitated by low velocity in intake manifolds, a large potential for further development of automobile engines resides in improvement of fuel induction systems.

The prior art has proposed the use of dual systems for fuel induction. The primary system incorporates a carburetor venturi and intake manifold of smaller than conventional cross section for use up to moderate rates of mixture flow. At larger mixture requirements, the flow through the first system is supplemented by progressive opening of the throttle in the carburetor of a secondary system whose venturi and intake manifold have larger cross-sectional area. Thus, the primary system is in use during all types of engine operation.

However, these proposed dual induction systems have failed to provide satisfactory solutions for the aforedescribed problems. When the secondary intake system is initially brought into operation, it is called upon to deliver only small amounts of fuel-air mixture to supplement that delivered by the primary intake system. Because of the large area of its venturi and manifold, and the relatively small amount of fuel-air charge, velocity through the secondary intake system is very low and consequently the capacity of the air stream for transportation of fuel by entrainment is quite small. As a result, the fuel that would move by entrainment at higher velocity tends to collect on the walls of the manifold of the secondary induction system. Thus, the very problem which is sought to be eliminated is introduced at higher speeds. This expedient not only falls short of solving the problem, but may actually contribute to it. Secondly, the large differences in gas velocity through the primary and secondary manifolds which have common termini, in combination with the suction pulsations attributable to opening and closing of intake valves, cause disturbances of flow. These result in an uneven delivery of the fuel to the various cylinders and are manifested by rough operation when the throttle of the carburetor of the secondary fuel-induction system is only partially open.

It is an object of this invention to provide a method of operating an internal combustion engine whereby maldistribution of fuel constituents is markedly reduced. Another object is to effect a significant reduction in the unburned hydrocarbons and carbon monoxide emitted from the engine. Still another object is to significantly improve fuel economy. A further object is to provide novel apparatus which in response to engine operating conditions effects a smooth transfer of fuel-air flow from a primary fuel intake system to a secondary intake system and vice-versa.

These and other objects of this invention are accomplished by providing a method of operating an internal combustion engine which comprises, under conditions of low fuel-air mixture demand, delivering a fuel-air mixture to the cylinders of said engine solely through a primary intake system comprising a carburetor and an intake manifold, the cross-sectional area of said primary intake system being sufficient to provide adequate fuel-air mixture under said conditions of low fuel-air mixture demand, but insufficient to provide adequate fuel-air mixture under conditions of high fuel-air mixture demand; and under conditions of high fuel-air mixture demand wherein the cross-sectional area of said primary intake system is insufficient to provide adequate fuel-air mixture, delivering the fuel-air mixture to said cylinders solely through a secondary intake system comprising a carburetor and an intake manifold, said secondary intake system having a large cross-sectional area relative to that of said primary intake system. At substantially the same instant that the secondary system is brought into operation, the mixture flow through the primary intake system is stopped. This procedure is reversed when mixture demands decrease to a predetermined level which is within the capacity of the primary intake system, and mixture flow is transferred from the secondary to the primary intake system.

Within the limit of providing adequate fuel-air mixture to operate the engine, it is desirable that the cross-sectional area of the primary system be as low as possible so that mixture velocity will be high. However, it is also desirable that the primary intake system be in use over as large a range of engine operating conditions as possible. These demands are conflicting, for the smaller the cross-section area of the primary system, the narrower is the range over which it can be used without excessive pressure loss. In turn, excessive pressure loss reduces the volumn of mixture that can flow into the cylinders and causes objectionable loss of power. Thus, between these opposing demands, the user can effect a compromise to meet a chosen level of performance and operating range.

Accordingly, the primary system is in operation only during periods of low mixture demands wherein it is capable of supplying the required fuel-air mixture without objectionable pressure loss and, hence, power loss. Under conditions of high mixture demand wherein the capacity of the primary system is exceeded, the fuel-air mixture is delivered to the engine solely through the secondary intake system.

As speed increases during acceleration, mixture demands are continually increased. At some speed the primary intake system imposes excessive restriction on mixture flow and an adequate amount of mixture to maintain the desired rate of acceleration cannot be delivered to the engine. Similarly, under road-load, constant-speed conditions, a speed is reached at which the primary intake system is incapable of delivering increased amounts of fuel-air mixture and consequently higher speeds cannot be attained. In the practice of this invention, at or below these limiting conditions, mixture flow is transferred from the primary to the secondary intake system.

The cross-sectional area of the secondary intake system is larger than the area of the primary system and must be large enough so as to be capable of supplying the required mixture under all operating conditions. While it is desirable to have the area as large as possible so as to improve volumetric efficiency, an upper limit is imposed. Beyond this limit, as area is increased, air velocity through the secondary system is decreased to the point where the condition sought to be eliminated by the method of this invention is approached.

In determining the relative areas of the primary and secondary systems, there is some degree of flexibility. Ordinarily, it is preferred to first determine the area of the primary system required to give the desired level of performance up to the maximum speed at which the primary system is to be used at full throttle. The area is made large enough so that, up to a maximum speed between about 1500 and 2000 r.p.m. at full throttle, pressure loss and hence power loss are not objectionable. However, the area should not be any larger than that required to meet this objective.

The area of the secondary intake system must be greater than that of the primary system, and large enough to provide adequate mixture under all operating conditions. When the primary and secondary intake systems are sized in accordance with these principles, the ratio of the cross-sectional area of the secondary system to that of the primary system is usually between 1.2:1 and 5:1, and preferably between about 2:1 and 4:1. At ratios below 1.2:1, the area of the secondary system would ordinarily be inadequate to provide sufficient fuel-air mixture under conditions of peak demand. Conversely, at ratios much higher than about 4:1, the area of the secondary system becomes too large and air velocity through the secondary system decreases to undesirably low levels.

According to the present invention, the secondary intake system, when brought into operation, completely replaces the primary intake system rather than supplementing it. The present method, while reducing maldistribution of fuel constituents, effecting sharp reductions in hydrocarbon and carbon monoxide emissions from the engine, improving the effectiveness of antiknock compounds and yielding improved economy, also overcomes the disadvantages of the prior art systems discussed above.

In another embodiment, this invention also provides novel apparatus which, in response to engine operating conditions, effects a smooth transfer of mixture flow from the primary to the secondary induction system and vice-versa. However, the means shown are only meant to be illustrative and in no way intended to limit the scope of the invention. Other systems for effecting the transfer will be apparent to those skilled in the art.

Referring to the attached drawings, FIGURES 3, 4, 4A, 5 and 6 illustrate a mechanism that effects a smooth transfer of fuel flow from the primary to the secondary intake system and vice-versa.

Figure 1:
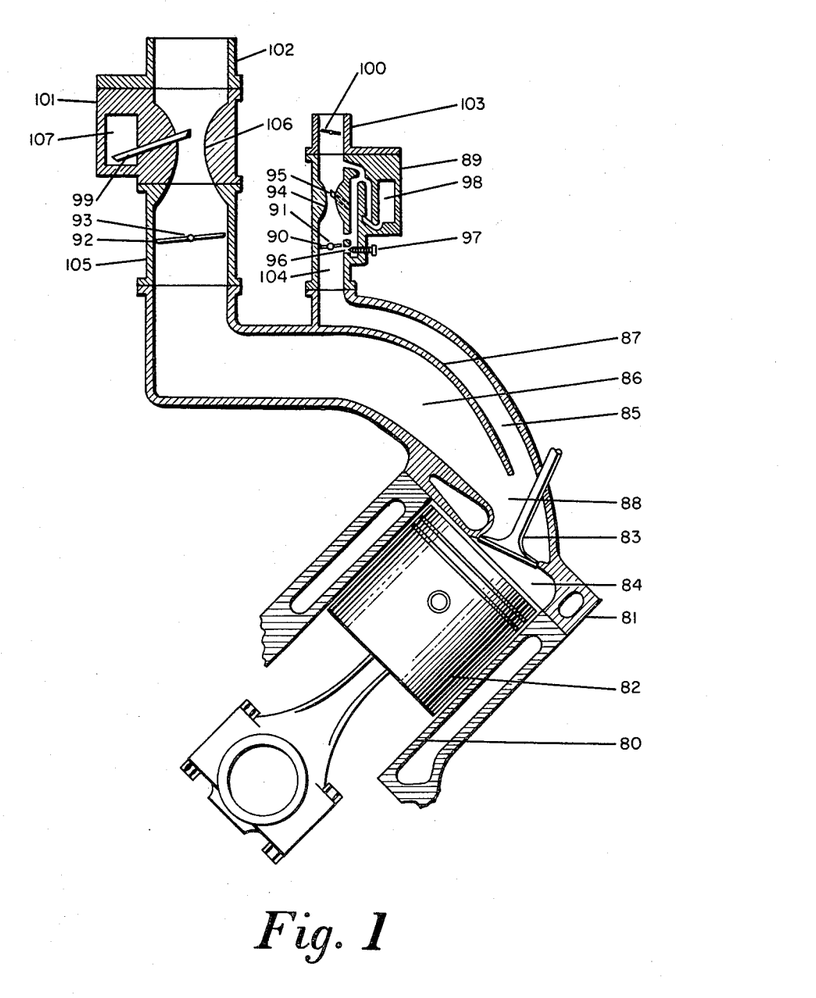
FIGURE 1 is a cross-sectional drawing of a cylinder and other components of an internal combustion engine, showing a branch of a primary and of a secondary fuel-induction system converging into a common intake port.

Referring more particularly to FIGURE 1, therein is shown an internal combustion engine, partially in cross section, having a cylinder 80, a cylinder head 81, a reciprocating piston 82, and an intake valve 83. The combustion chamber is designated as 84. The fuel-air charge is drawn into the combustion chamber 84 through primary intake manifold 85 and secondary intake manifold 86, which are separated by wall 87, and which converge into single port 88. Port 88 communicates with combustion chamber 84. Primary intake manifold 85 has a small cross-sectional area relative to that of secondary intake manifold 86. Primary intake manifold 85 terminates at and communicates with throttle body 104 of carburetor 89, and is controlled by throttle valve 90 mounted on throttle shaft 91. Secondary intake manifold 86 terminates at and communicates with throttle body 105 of carburetor 101 and is controlled by throttle valve 92 mounted on throttle shaft 93.

Carburetor 89 contains a venturi 94, a main fuel jet 95, an idle jet 96, an idle adjustment screw 97, a float bowl 98, and a choke valve 100.

Carburetor 101 contains mechanisms described for carburetor 89 including main fuel jet 99 and float bowl 107, but need not have an idle system or choke. Venturi 106 of carburetor 101 is of large diameter relative to that of venturi 94 of carburetor 89. Carburetor 101 has air horn 102 which has a large cross-sectional area relative to air horn 103 of carburetor 89.

Carburetors 89 and 101 operate independently and in the usual manner. Air, drawn in through air horns 103 and 102, is mixed with fuel provided by the carburetor float bowls 98 and 107 through fuel jets 95 and 99. The fuel-air charge is then drawn through intake manifolds 85 and 86 and delivered to combustion chamber 84.

In operation, when the engine is started, throttle valve 92 is completely closed, only throttle valve 90 being operable. The fuel-air mixture flows through the primary intake system including carburetor 89 and intake manifold 85. Under low-speed conditions, due to the reduced cross-sectional area of the primary intake system including venturi 94, throttle body 104 and primary manifold 85, air velocity therethrough will be relatively high, resulting in maximum entrainment of fuel particles. As speed increases and mixture demands exceed the capacity of the primary intake system, fuel-air flow is transferred by apparatus, which will be subsequently described, to the secondary intake system including venturi 106, throttle body 105 and intake manifold 86. At this time throttle valve 92 is partially or completely opened, depending on the position of the throttle pedal, and at substantially the same instant, throttle valve 90 is completely closed, thereby transferring mixture flow from the primary to the secondary intake system. Mixture flow continues through the secondary intake system until mixture demand is decreased to a level within the capacity of the small primary intake system. At this point throttle valve 90 is partially or completely opened and, at substantially the same instant, throttle valve 92 is closed, transferring mixture flow from the secondary to the primary intake system.

Due to the relatively high engine speed when mixture flow is transferred from the small to the large intake system, generally no perceptible change in engine torque is evidenced. However, to insure an absolutely smooth transfer without momentary vehicle hesitation, means may be incorporated in the control system to insure the availability of sufficient fuel to prevent misfiring or substantial power loss attributable to lean mixture. For example, the closing of throttle 90 of primary carburetor 89 may be made slightly less rapid than opening of throttle 92 of secondary carburetor 101. This permits mixture flow to continue in the primary fuel-induction system during a few engine revolutions while mixture flow is being established in the secondary fuel-induction system. Alternatively, the opening of throttle 92 of secondary carburetor 101 may be retarded at a rate similar to that for the closing of throttle 90 of primary carburetor 89. A similar result is obtained if the mixture flow in the primary fuel-induction system during the closing of the throttle of the primary carburetor is supplemented by a small amount of additional fuel delivered by a pump or other means to the air passing through the primary induction system. Alternatively, a small amount of additional fuel may be delivered by a pump or other means to the air passing through the secondary induction system when throttle 92 of the secondary carburetor is opened.

From the foregoing, it is apparent that, under conditions requiring relatively small volumes of fuel-air mixture, an intake system of reduced area is used exclusively and air velocity is sufficiently high to entrain substantially all the unvaporized fuel delivered by carburetor 89. Under conditions requiring volumes of mixture in excess of the capacity of the small intake system, the mixture is delivered to the cylinders via the larger, secondary intake system. When the secondary system is in operation, air velocity therethrough is sufficient to entrain substantially all the unvaporized fuel delivered by the larger carburetor 101. By this method an almost ideal air-fuel mixture is provided to the engine under all operating conditions. Air velocity through the manifolds is always sufficient to entrain most of the unvaporized fuel components, thereby reducing fuel maldistribution to a minimum. As a consequence, overrich fuel-air mixtures can be avoided with resultant reduction of the concentrations of unburned hydrocarbons and carbon monoxide in the exhaust products. A further benefit of the leaner mixtures is improved fuel economy. Also, because of the higher air velocity in the primary fuel-induction system at the beginning of acceleration than in conventional systems, lag of vaporized and unvaporized antiknock compounds in the manifold is minimized and the effectiveness of antiknock compounds is enhanced.

Although in the above embodiment carburetors 89 and 101 are shown as separate units with independent fuel bowls, it is contemplated that the two carburetors may be designed as an integral unit having a single float bowl. Similarly, while primary intake manifold 85 and secondary intake manifold 86 have been shown as an integral unit, it is equally possible that the two manifolds be completely separated and independent of each other, each communicating with the intake ports.

The cross-sectional area of both the carburetor venturi and the intake manifold varies considerably among currently manufactured engines, dependent inter alia, upon engine size and the manufacturer's preference. Present standard intake systems represent a compromise between a small intake system to reduce maldistribution of fuel to the cylinders when the rate of air flow is low and a large system offering minimum resistance to flow when the demand for fuel and air is high.

The present invention permits the primary intake system to be designed specifically for relatively high velocity of flow over the lower range of mixture requirements without sacrifice of engine performance when the larger volumes of mixture are required. Similarly, the secondary fuel intake system can be tailored to meet high-volume demands without incurring the low-speed problems associated with conventional systems.

Figure 2:
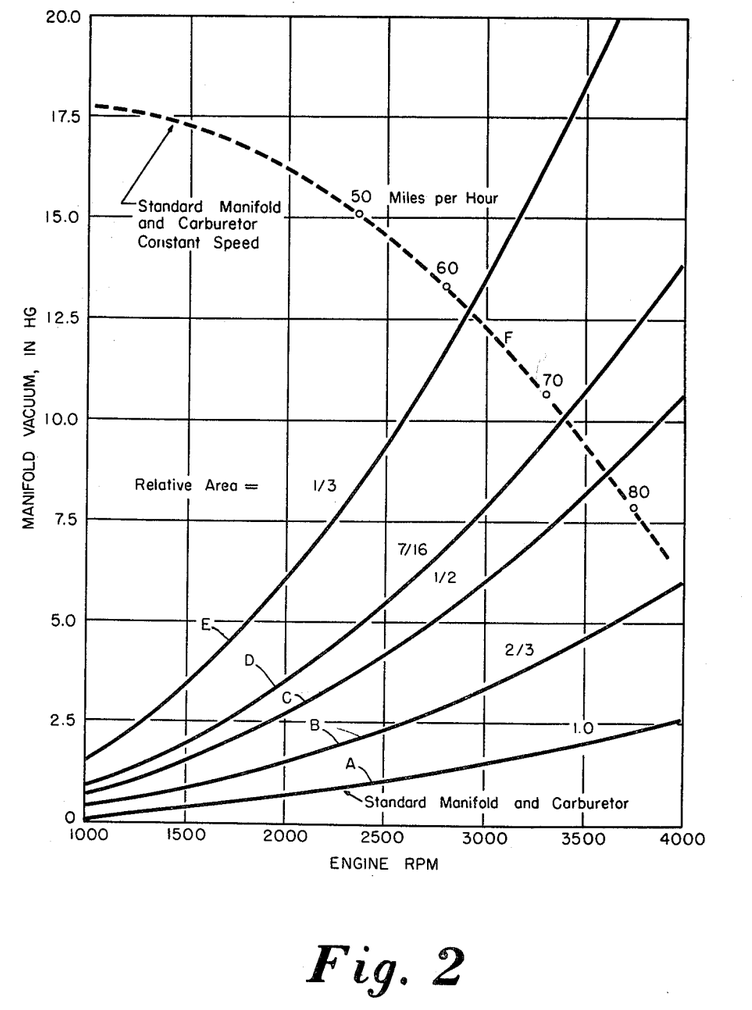
FIGURE 2 is a graphical showing of the relationship between manifold vacuum and speed for an automobile having a manual transmission.

In FIGURE 2 the vertical scale is manifold vacuum in inches of mercury and the horizontal scale is engine speed expressed as revolutions per minute. Curve A of FIGURE 2 shows the variation in manifold vacuum with engine speed at full throttle for a current four-cylinder automobile equipped with a manual transmission. The displacement of the engine is about 195 cubic inches and the cross-sectional area of each branch of the standard manifold at the intake port is approximately two square inches. Curves B, C, D and E of FIGURE 2 indicate the calculated variation of manifold vacuum at full throttle with engine speed for fuel-induction systems of this engine whose cross-sectional areas at all points are ⅔, ½, ⁷⁄₁₆ and ⅓, respectively, of the cross-sectional areas of the standard intake manifold and carburetor venturi. Curve F of FIGURE 2 shows, for constant car speeds on level road, the manifold vacuum at any engine speed for the standard induction system. Points shown on curve F indicate the manifold vacuum and engine speed at constant car speeds of 50, 60, 70 and 80 miles per hour on level road.

FIGURE 2 indicates that for this particular vehicle a small manifold and carburetor having about ⁷⁄₁₆ of the area of the standard manifold and carburetor venturi can provide adequate amounts of mixture up to just above 70 miles per hour under constant speed conditions. At higher vehicle cruising speeds, the resistance to flow through such a system would be too high to permit the required volume of flow. For example, at 80 miles per hour, corresponding to 3750 engine r.p.m., curve F shows that the required manifold vacuum is about 7.8 inches of mercury whereas curve D indicates that an induction system having ⁷⁄₁₆ the cross-sectional area of the standard system would produce vacuum of about 12.3 inches of mercury at 3750 r.p.m.

Under cruising conditions at about 3400 r.p.m., corresponding to a little more than 70 miles per hour, the secondary intake system is brought into operation and mixture flow through the primary intake system is stopped. If preferred, the larger system may be brought into operation at a lower speed. When the cross-sectional area of a primary intake system has been chosen for a given engine, the maximum cruising speed obtainable with the primary system is established. Accordingly, the larger secondary system is brought into operation at or below this limiting speed.

It is possible to operate the vehicle at all speeds below the above maximum using the primary intake system. However, under some low-speed conditions, the area of the primary system may become limiting and the desired level of performance cannot be obtained. For example, since power produced at full throttle decreases with an increase in manifold vacuum, it is ordinarily preferred that manifold vacuum not exceed about 2 inches of mercury at 1500 r.p.m. when the throttle pedal is fully depressed. At manifold vacuums much higher than this value, the vehicle could not be accelerated at the desired rate. Because of the more nearly uniform distribution of fuel to the cylinders by the primary intake system, acceleration at full throttle up to about 1500 r.p.m. is usually as rapid as with the standard system even though the manifold vacuum produced by the latter is somewhat lower. However, at higher engine speeds the accelerative ability of the car operating with the primary carburetor at full throttle is less than during operating with the secondary carburetor at full throttle. Thus, when maximum torque is needed, mixture flow is transferred from the primary to the secondary system at or prior to the speed where the area of the primary system becomes limiting with respect to the desired level of performance. Under other engine operating conditions, it is preferred that transfer occur only when the small throttle is fully opened and the manifold vacuum exceeds about 2 inches of mercury. Thus at all conditions up to about 1500 r.p.m., the fuel-air mixture is delivered to the cylinders solely through the primary intake system regardless of manifold vacuum. At speeds from about 1500 r.p.m. to the previously set upper limit (say about 70 m.p.h.) the primary system is in operation under all conditions except that combination with respect to the primary system of full throttle and manifold vacuum greater than 2 inches of mercury. Under the latter condition and under all conditions above about 70 m.p.h., the fuel-air mixture is delivered to the cylinders solely through the secondary intake system, and the primary system is inoperative.

With the aforedescribed vehicle, the cross-sectional area of each branch of the large manifold at the intake port was about 2 square inches. The small intake system had a manifold with a cross-sectional area of about 0.8 square inch at each branch at the intake port. Thus the ratio of the area of the secondary system to the smaller primary system was about 2.5:1. Operating this vehicle in accordance with the method of this invention provides benefits in terms of reduced maldistribution of fuel constituents, reduced emissions in the exhaust stream and increased fuel economy.

Figures 3, 4, 4A:
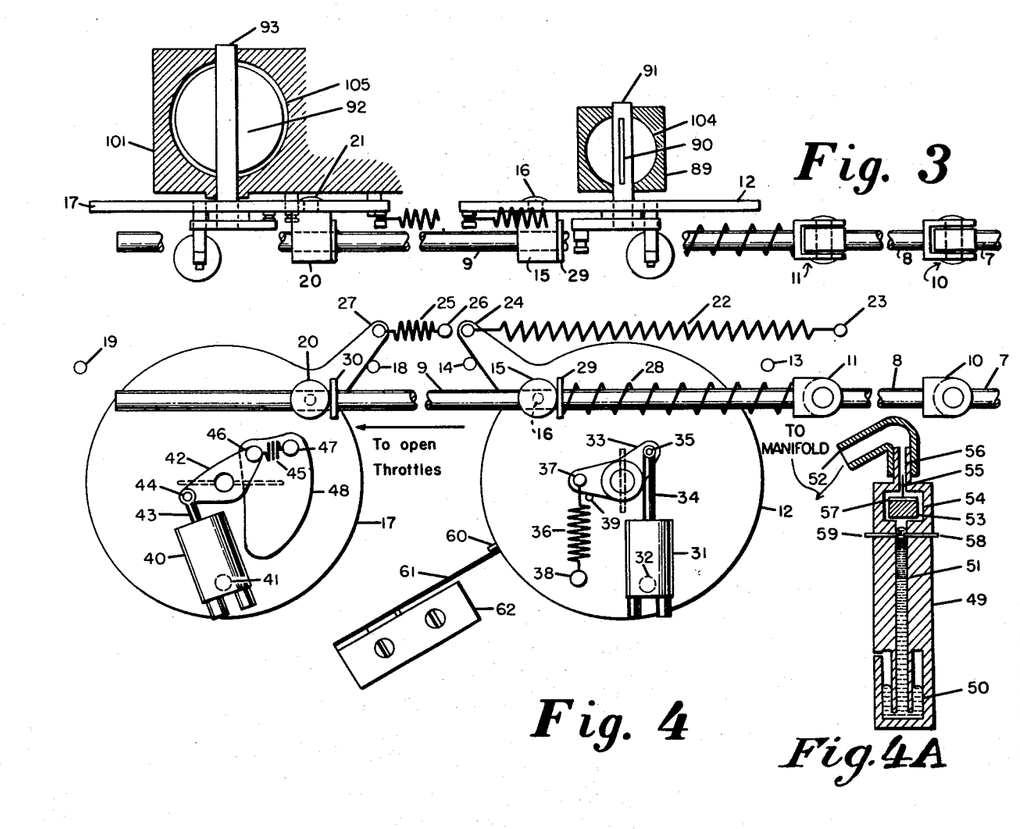
FIGURE 3 being a top view.
FIGURE 4 a front elevation.
FIGURE 4A separate detail.
Figure 5:
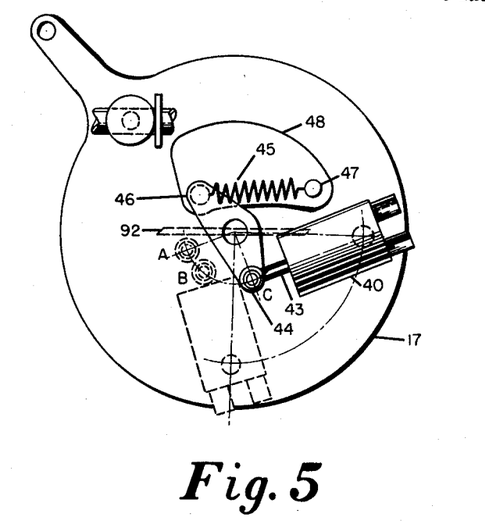
FIGURE 5 an enlarged view of the details of bracket 17 in FIGURE 4.
Figure 6:
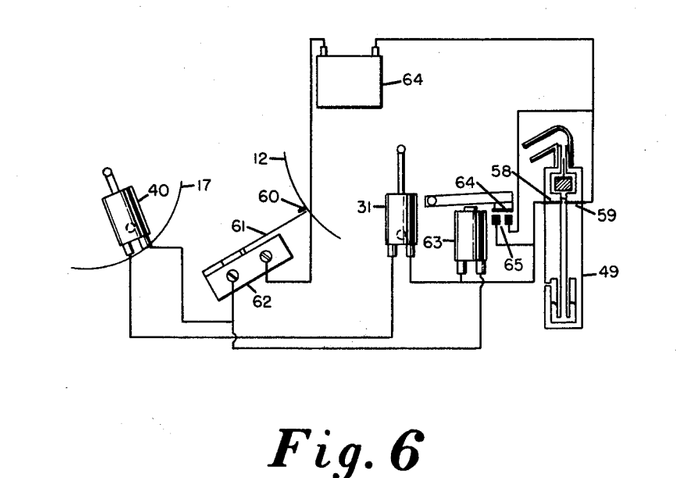
FIGURE 6 an electrical circuit used to effect the transfer.

In another embodiment, this invention provides novel apparatus which, in response to engine operating conditions, effects a smooth transfer of fuel-air flow from the primary to the secondary intake system and vice-versa. FIGURE 3 is a top view of the apparatus; FIGURE 4 is a front elevation; FIGURE 4A is a pressure-sensing means; FIGURE 5 shows the details of bracket 17; and FIGURE 6 shows the electrical circuit used to actuate the apparatus.

In FIGURES 3 and 4, 104 is part of the throttle body of carburetor 89 with a small venturi; 90 is the throttle valve and 91 is the throttle shaft. Carburetor 101 with a larger venturi has throttle body 105, throttle valve 92 and throttle shaft 93. The throttle valve of the smaller carburetor is shown in substantially open position while the throttle valve of the larger carburetor is shown in the closed position. In the figures, 7 is a rod from the linkage actuated by the throttle pedal (not shown). The linkage has a conventional spring (not shown) for returning the throttle pedal to its normal position. Rod 7 has extensions 8 and 9 with hinges or swivels at 10 and 11. A bracket 12 is mounted on and free to rotate on throttle shaft 91. Angular rotation of bracket 12 is limited by stops 13 and 14 attached to the carburetor having the smaller venturi. A cylinder 15 receives rod 9 and has a concentric extension 16 of reduced diameter which forms a shaft. A hole drilled in bracket 12 receives the shaft 16. The shaft 16 is free to rotate in the hole drilled in bracket 12. A hole drilled in cylinder 15 at right angles to the cylindrical axis permits sliding of rod 9 relative to cylinder 15.

A second bracket 17 is mounted on and free to rotate on throttle shaft 93. Angular rotation of bracket 17 is limited by stops 18 and 19 attached to the carburetor having the larger venturi.

A cylinder 20 similar to cylinder 15 also has a concentric extension of reduced diameter, 21, which forms a shaft. A hole drilled in bracket 17 receives the shaft 21. The shaft 21 is free to rotate in the hole drilled in bracket 17. A hole drilled in cylinder 20 at right angles to the cylindrical axis permits sliding of rod 9 relative to cylinder 20.

One end of a weak tension coil spring, 22, is attached at 23 to a non-moving component of the engine such as the body of the small carburetor. The other end of the spring is attached to a lug 24 on bracket 12 and tends to pull the lug toward stop 13.

One end of a weak tension coil spring 25 is attached at 26 to a non-moving component of the engine such as the body of the larger carburetor. The other end of the spring 25 is attached to a lug 27 on bracket 17 and tends to pull the lug toward stop 18.

One end of a compression coil spring 28, stronger than springs 22 and 25, is fitted over rod 9 and is compressed between hinge joint 11 and a washer 29 that is thereby pressed against cylinder 15.

When the foot pedal that controls the carburetor throttles is in normal fully raised position, lug 24 is in contact with stop 13 and lug 27 is in contact with stop 18. As pressure is applied to the foot pedal to move it downwardly, rod 7 is moved to the left as seen in FIG. 4. This causes hinge 11 to compress spring 28 and push cylinder 15 to the left, stretching spring 22 until lug 24 of bracket 12 is in contact with stop 14. During this movement, rod 9 slides in the hole in cylinder 20 until an enlarged portion at 30 is in contact with cylinder 20. Further depression of the throttle-control foot pedal causes the enlargement 30 on rod 9 to push cylinder 20 to the left until lug 27 is in contact with stop 19.

Movement of throttle valve 90 relative to bracket 12 is effected by solenoid 31 which is mounted on bracket 12 by means of pin 32. Solenoid 31 is free to rotate about pin 32. Bell crank 33 is rigidly mounted on throttle shaft 91. Plunger 34 of solenoid 31 has a bearing on the end to receive pin 35 which is attached to one arm of bell crank 33. A loop at one end of a tension spring 36 is hooked over pin 37 at the end of the other arm of bell crank 33. A loop at the other end of spring 36 is hooked over pin 38 which is mounted on bracket 12.

Spring 36 normally holds one arm of a bell crank 33 in contact with a stop 39 mounted on bracket 12. When bell crank 33 is in this position, throttle valve 90 moves along with and in fixed relation to bracket 12. When solenoid 31 is energized, throttle shaft 91 moves 90° clockwise and assumes a new fixed position relative to bracket 12, thus closing throttle valve 90.

Movement of throttle valve 92 relative to bracket 17 is effected by solenoid 40 which is mounted on bracket 17 by means of pin 41. Solenoid 40 is free to rotate about pin 41. A bell crank 42 is rigidly mounted on throttle shaft 93. Plunger 43 of solenoid 40 has a bearing on the end to receive pin 44 which is attached to one arm of bell crank 42. A loop at one end of tension spring 45 is hooked over pin 46 at the end of the other arm of bell crank 42. A loop at the other end of spring 45 is hooked over pin 47 which is mounted on the body of the larger carburetor. A cutout 48 in bracket 17 permits bracket 17 to clear spring 45 during the rotation of bracket 17 on shaft 93.

When bracket 17 is in the position shown in FIGURE 4, spring 45 holds throttle valve 92 in the closed position. Under this condition the bearing on the end of solenoid plunger 43 occupies the position as shown in FIGURE 4.

FIGURE 5 shows the operation of bracket 17 in relation to controlling the position of throttle valve 92. When throttle valve 92 is fully closed and bracket 17 is in the position as shown in FIGURE 4, the bearing on the end of solenoid plunger 43 occupies the dashline position A as shown in FIGURE 5. When solenoid 40 is energized with bracket 17 in the position shown in FIGURE 4, throttle shaft 92 is rotated counterclockwise to a position such that the area of the throttle opening of the larger carburetor is equal to the full-throttle opening of the small carburetor. Under this condition the bearing on the end of solenoid plunger 43 occupies dashline position B in FIGURE 5.

Downward movement of the throttle pedal rotates bracket 17 counterclockwise after cylinder 20 is engaged by enlargement 30, and such rotation while solenoid 40 is energized causes throttle valve 92 to rotate along with and in fixed relation to bracket 17. Before lug 27 on bracket 17 contacts stop 19, throttle valve 92 is fully open. When lug 27 is in contact with stop 19, the components mounted on bracket 17 occupy the full line positions indicated in FIGURE 5.

Operation of solenoids 31 and 40 is controlled by vacuum in the manifolds of the dual-induction system or other appropriate means such as a velocity sensing device to sense the mass of fuel-air mixture flow. Referring to FIGURE 4a, a mercury manometer 49 has a mercury well 50 which is vented to the atmosphere, and a vertical tube 51. A chamber 54 is an enlargement of tube 51 and leads to another tube 56. Manifold vacuum is applied to tube 56 through tube 52. When vacuum is created in the manifolds, mercury rises in tube 51. A float 53 in chamber 54 above tube 51 has a guide 55 which operates in tube 56. A resilient disc 57 attached to the top of float 53 seals the end of tube 56 when mercury rises in chamber 54.

Electrodes 58 and 59 are positioned in tube 51 at a height such that, when the mercury touches them, the height of the mercury column above the surface of the mercury in well 50 is equivalent to the manifold vacuum at which it is desired to shift operation from the small to the larger carburetor, hereinafter assumed to be 2 inches. A pin 60 on bracket 12 actuates lever 61 to close microswitch 62 when lug 24 contacts stop 14.

When the throttle pedal is fully depressed and lug 27 of bracket 17 is in contact with stop 19, the throttles of the two carburetors remain in the positions illustrated in FIGURES 4 and 5 until rising speed increases manifold vacuum sufficiently to cause the mercury in manometer 49 to bridge the gap between electrodes 58 and 59. Since at this point microswitch 62 also is closed, and manometer 49 and as described below microswitch 62 are electrically in series with the coils of solenoids 31 and 40, the solenoids are energized. Solenoid 31 thus closes throttle valve 90 and solenoid 40 opens throttle valve 92.

As pressure on the throttle pedal is released and the pedal moves upwardly, throttle valve 92 rotates clockwise along with bracket 17. When lug 27 contacts stop 18, the throttle opening of the larger carburetor is equal to the full-throttle opening of the small carburetor. A slight further release of the throttle pedal allows pin 60 to open the contacts in microswitch 62. Solenoids 31 and 40 are thus de-energized, completely closing throttle valve 92 and opening throttle valve 90. During further release of the throttle pedal, control of engine operation is through movement of throttle valve 90 in the small carburetor, regardless of manifold vacuum.

If the car is allowed to accelerate at a position of the throttle pedal which locates lug 27 between stops 18 and 19, throttle valve 90 is open and throttle valve 92 is closed until manifold vacuum becomes sufficient for mercury to bridge the gap between electrodes 58 and 59. Throttle valve 90 then closes and throttle valve 92 opens partially to provide flow area which is larger than the full-throttle opening of the small carburetor. Thus, during acceleration at manifold vacuum greater than 2 inches mercury when lug 24 is in contact with stop 14, engine operation is controlled only by throttle valve 92 whose position is determined by the amount of depression of the throttle pedal.

At constant speeds on level road up to the maximum capacity of the small carburetor, say up to 70 miles per hour, throttle valve 90 is less than wide open and lug 60 on bracket 12 is not in contact with the lever arm 61 of microswitch 62. The throttle-operating solenoids are not energized and throttle valve 92 remains closed. Thus, under these conditions, only the small manifold and small carburetor are in use.

The electrical circuit used to actuate the solenoids is shown in FIGURE 6. Throttle-operating solenoids 31 and 40, microswitch 62, electrodes 58 and 59 of manometer 49 and relay 63 are connected with the car battery 64 as shown thereon. The coil voltage of solenoids 31 and 40 is one-half the battery voltage and the coil voltage of relay 63 is equal to the battery voltage.

The purpose of the relay 63 in FIGURE 6 is to prevent hunting by the control system after transfer from the primary intake system of small cross-sectional area to the larger system. During acceleration from low engine speed with the throttle pedal fully depressed, the throttle of the small carburetor is completely open and the throttle of the larger carburetor is closed until manifold vacuum reaches a predetermined level, say about 2 inches of mercury at 1500 to 1600 r.p.m. At this point the throttle of the small carburetor closes and the throttle of the larger carburetor moves to the wide-open position. As a result, as indicated by FIGURE 2, manifold vacuum falls below 2 inches of mercury. In the absence of the relay, the electrical circuit then would be broken between electrodes 58 and 59 of FIGURE 4, the throttle-control solenoids would be de-energized, and the small carburetor again would come into operation. Manifold vacuum again would rise to a level above 2 inches of mercury and the cycle would be repeated.

The coil of the relay is energized when the throttle-control solenoids are energized, causing relay contacts 65 to be bridged. When manifold vacuum falls below 2 inches of mercury due to full opening of the larger throttle, the bridge across the relay contacts maintains the electrical circuit after the mercury level has fallen below the electrodes in the manometer. Consequently, the larger carburetor remains in operation until easing of pressure on the throttle pedal causes the circuit to be broken at microswitch 62.

To insure smooth engine operation while transfer is made from the primary to the secondary fuel-induction system, it may be desirable to have a few engine revolutions occur during the closing of throttle valve 90 of the small carburetor and the opening of throttle valve 92 of the large carburetor, as indicated hereinbefore. Such retardation may be accomplished by attachment of a throttled dashpot to solenoids 31 and 40 or by other equivalent means.

It will be understood that the desired operation of the throttle valves of the carburetors in the primary and secondary fuel-induction systems also may be obtained by other than electrical means. For example, cylinders operated by vacuum or pressure may be substituted for solenoids 31 and 40, and a relay operated by vacuum or pressure may be substituted for electric relay 63. Similarly, a pneumatic valve operated by manifold vacuum may be substituted for mercury manometer 49. Likewise, the mechanism intended to transfer engine operation from the primary to the secondary fuel-induction system, and vice-versa, may be actuated by velocity sensing means in the manifold instead of by manifold vacuum sensing means.

I claim:

1. An internal combustion engine having a plurality of cylinders, a primary induction system connected to supply fuel to the cylinders, said system including an intake manifold having a cross-sectional area too small to supply enough fuel for operating the engine at maximum power, a secondary induction system connected to supply fuel to the cylinders, said secondary system including an intake manifold having a cross-section large enough to supply fuel for operating the engine at maximum power, and automatic mechanism connected to both induction systems to cause fuel to be supplied solely through the intake manifold of the primary system at low engine power demands, and to cause fuel to be supplied solely through the intake manifold of the secondary system at higher engine power demands.

2. The combination of claim 1 in which each induction system includes carburetion structure and its own throttle valve, and the throttle valves are connected as part of the automatic mechanism and act to shift the fuel supply from one intake manifold to the other.

3. The combination of claim 1 in which the automatic mechanism includes a sensing device that responds to the position of an accelerator control as well as to the degree of vacuum in the intake manifold of the induction system.

4. The combination of claim 2 in which the automatic mechanism includes a sensing device electrically operated by a pair of switches connected in series, one of the switches being connected to respond to the position of the throttle in the primary induction system, and the other switch being connected to respond to the degree of vacuum in the primary intake manifold.

5. The combination of claim 3 in which the sensing device is connected to respond to the degree of vacuum for shifting the fuel supply from the primary intake manifold to the secondary intake manifold, but not to otherwise respond to the degree of vacuum.

6. The combination of claim 1 in which the cross-sectional areas of the two manifolds are in the ratio of from about 2:1 to 4:1.

7. A dual induction system for engines having a plurality of cylinders, said system having a primary intake manifold for the cylinders, a secondary intake manifold for the cylinders, the cross-sectional area of the secondary intake manifold and the cross-sectional area of the primary intake manifold being in the ratio of from about 1.2:1 and 5:1, and flow control elements connected to block off one intake manifold at all times, to select the primary intake manifold for blocking under some conditions, and to select the secondary intake manifold for blocking under other conditions.

8. The combination of claim 7 in which the ratio is between about 2:1 and 4:1.

9. The combination of claim 7 in which the system includes carburetion means and the flow control elements are throttle valves connected to the respective manifolds.

10. The combination of claim 7 in which the flow control elements are part of an automatic mechanism that responds to the position of an accelerator control as well as to the degree of vacuum in the intake manifolds of the induction system.

11. The combination of claim 9 in which the flow control elements are part of an automatic mechanism that includes a sensing device electrically operated by a pair of switches connected in series, one of the switches being connected to respond to the position of the throttle in the primary intake manifold, and the other switch being connected to respond to the degree of vacuum in the primary intake manifold.

12. The combination of claim 11 in which the sensing device is connected to respond to the degree of vacuum for shifting the blockage from the secondary intake manifold to the primary intake manifold, but not to otherwise respond to the degree of vacuum.

13. An automatic induction system control mechanism for controlling the throttles of parallel-connected intake manifolds, said mechanism including a linkage selectably connectable to the throttles and sensing means connected to respond to an open position of one throttle and to the degree of vacuum in one manifold to automatically cause the linkage to close said one throttle and simultaneously open the other, said sensing means being further connected to automatically close the last-mentioned throttle and simultaneously open the first-mentioned throttle.

14. The combination of claim 13 in which the sensing means is connected to respond solely to the position of the first-mentioned throttle for performing the last-mentioned operation.

15. The combination of claim 13 in which the sensing elements include two switches connected in series, one responsive to the position of the first-mentioned throttle and the other responsive to the degree of vacuum.

16. A method of operating a spark-ignited multi-cylinder internal combustion engine, which method comprises (a) operating the engine under conditions of low fuel-air mixture demand by delivering such mixture to the individual cylinders solely through an intake manifold having a cross-sectional area sufficient to provide adequate mixture under said conditions of low mixture demand, but insufficient to provide adequate mixture under conditions of high mixture demand, and (b) when the engine has such high fuel-air mixture demand, delivering the mixture to the individual cylinders solely through an intake manifold having a cross-sectional area larger than that of the low-demand manifold and large enough to provide adequate mixture under maximum demand conditions.

17. The method of claim 16 in which the cross-sectional area of the low-demand intake manifold is about 0.8 square inch for every 195 cubic inches of engine displacement.

18. A method of operating a spark-ignited multi-cylinder internal combustion engine, which method comprises (a) operating the engine under conditions of low fuel-air mixture demand by delivering such mixture to the individual cylinders solely through a throttle controlled intake manifold having a cross-sectional area sufficient to provide adequate mixture under said conditions of low mixture demand, but insufficient to provide adequate mixture under conditions of high mixture demand, and (b) diverting the mixture through a manifold of sufficiently large cross-section to adequately supply the mixture for maximum power demand only when the throttle of said throttle-controlled manifold is open to the maximum and the vacuum in the last-mentioned manifold reaches a predetermined threshold.

19. The method of claim 18 in which the cross-sectional area of the low-demand intake maifold is about 0.8 square inch for every 195 cubic inches of engine displacement.

20. The method of claim 18 in which the diversion is continued so long as the throttle of the throttle-controlled manifold is open to the maximum, regardless of manifold vacuum changes.

21. The method of claim 18 in which the threshold vacuum is about 2 inches of mercury.

22. In an automatic gasoline engine induction system control mechanism for controlling the throttles of parallel-connected intake systems each of which has its own intake manifold to reduce the resistance to passage of a fuel-air mixture through one manifold under high mixture demand conditions, sensing means connected to respond to the maximum open position of one throttle and to a threshold degree of vacuum in a manifold, said sensing meanns being further connected to reduce the resistance to passage of said mixture only when said one throttle is in said maximum open position and the degree of manifold vacuum has reached said threshold.

23. The combination of claim 22 in which the sensing means is further connected to maintain the reduced passage resistance so long as said one throttle remains in said maximum open position regardless of variation in degree of manifold vacuum.

24. The combination of claim 22 in which the threshold manifold vacuum is about 2 inches of mercury.

References Cited in the file of this patent
UNITED STATES PATENTS

| | | |
|---|---|---|
| 1,506,548 | Pingree | Aug. 26, 1924 |
| 1,651,250 | Brownback | Nov. 29, 1927 |
| 2,317,625 | Mallory | Apr. 27, 1943 |
| 2,705,942 | Braun | Apr. 12, 1955 |